United States Patent Office 3,344,204
Patented Sept. 26, 1967

3,344,204

COPOLYMER OF BUTADIENE AND NORMAL ALPHA-OLEFINS

Thomas J. Clough, Glenwood, and David W. Young, Homewood, Ill., assignors to Sinclair Research, Inc., Wilmington, Del., a corporation of Delaware No Drawing. Original application Nov. 15, 1962, Ser. No. 238,039, now Patent No. 3,252,772, dated May 24, 1966. Divided and this application Oct. 7, 1965, Ser. No. 515,771
2 Claims. (Cl. 260—680)

This application is a division of application Serial No. 238,039, filed November 15, 1962, now U.S. Patent 3,252,772.

This invention relates to a novel polymer having particular utility as a pour depressor for mineral oil fuels.

It is known in the art to add pour depressors to hydrocarbon fuels to permit their flow at low temperatures. Many different types of materials are known to depress the pour point of hydrocarbon fuels but most have to be employed in disadvantageously large concentrations to provide the desired results.

We have now found that the oil-compatible polymerization products of butadiene-1,3 and a mixture of normal alpha olefins of 16 to 18 carbon atoms when added in small amounts to mineral oil fuels substantially reduce the pour point of the fuels. Moreover, it has been found that polymerization of butadiene with a mixture of $C_{16}$ to $C_{18}$ alpha olefins provides a polymer having unexpectedly superior pour depressing properties than say does a polymer of butadiene and a normal $C_{18}$ alpha olefin alone.

The proportions of butadiene and the $C_{16}$–$C_{18}$ alpha olefin polymerized may vary and generally will fall in the range of about 1 to 20% butadiene, preferably about 2 to 15% butadiene, and 99 to 80%, preferably about 98 to 85% of the mixed alpha olefins. The mixed normal alpha-olefin or monoalkene component consists essentially of at least about 25% $C_{16}$ olefin and at least about 20% $C_{18}$ olefin. Often these olefins are in further admixture with normal alpha-olefins of 10 to 24 or 12 to 20 carbon atoms, and in such mixtures the non-$C_{16}$ to $C_{18}$ olefins may be up to about 50% of the overall component, frequently not more than about 35 or 40%.

The polymerization product of the present invention can be prepared by polymerizing the butadiene and alpha-olefins at a temperature of about −10° C. to 100° C., preferably about 0° to 50° C. in the presence of a Friedel-Crafts catalyst, such as aluminum chloride, aluminum bromide, titanium tetrachloride, boron tri-fluoride etherate, etc. The preferred catalysts are metal halides, especially aluminum chloride. It is preferred that an inert diluent for the catalyst be also employed and when used will generally be present in an amount of about 0.5 to 5 volumes of diluent per volume of the mixed alpha-olefin feed. Suitable inert diluents are, for instance, alkanes of 3 to 8 carbon atoms such as propane, butane, pentane, hexane, octane as well as lower alkyl halides of say 1 to 4 carbon atoms such as methyl chloride, ethyl chloride, propyl chloride and other non-polymerizable lower alkanes and alkyl halides. The Friedel-Crafts catalyst will generally be present in catalyst solution in a concentration of about .5 to 5% by weight, preferably 2 to 5% and the total amount of the catalyst employed is generally about 0.1 to 15% by weight per 100 parts of the polymer feed.

After the polymerization has been effected, either by batch or continuous operation, the resulting polymer can be separated from residual catalyst as by washing with water, alcohol, dilute aqueous caustic soda or other suitable hydrolyzing and washing methods. The polymerization product is a normally liquid, light-colored, viscous oil having a Staudinger molecular weight of about 1000 to 20,000. The kinematic viscosity of the polymer will usually be about 30 to 600, preferably 75 to 300 centistokes at 210° F.

The mineral oil bases which are improved in accordance with this invention are liquid petroleum hydrocarbon fuel oils boiling primarily above the gasoline range and include, for instance, diesel fuels, domestic fuel oils, etc. These oils are usually petroleum middle distillates and commonly have relatively high pour points, for instance at least about −10° F. or higher. The oils can be in their relatively crude state or they can be treated in accordance with well-known commercial methods such as acid or caustic treatment, etc. Fuel oils which can be improved by the polymers of this invention, are, for instance, hydrocarbon fractions boiling primarily in the range of about 300° to 750° F. The fuel oils can be straight run distillate fuel oils, catalytically or thermally cracked distillate fuel oils or mixtures of straight run fuel oils, naphthas and the like with cracked distillate stocks. The cracked materials will frequently be about 15 to 70 volume percent of the fuel.

The polymerization product of the present invention can be incorporated in the mineral oil base by simply blending with stirring at ordinary temperature or, if desired, a mixture of the oil and the polymerization product can be heated to elevated temperatures, e.g. 100 to 130° C. with agitation. The polymerization product is added to the mineral oils in small amounts sufficient to reduce the pour point. The actual amounts added are dependent on the particular oil and polymerization product employed. Often the amounts will fall in the range of about .01 to 1% by weight or more preferably about 0.1 to 0.5%.

The following examples are included to further illustrate the present invention:

*Example I*

To a mixture of alpha olefins of approximate composition:

7% $C_{13}$ alpha olefin
16% $C_{14}$ alpha olefin
40% $C_{16}$ alpha olefin
30% $C_{18}$ alpha olefin
7% $C_{20}$ alpha olefin was added 5% by weight butadiene-1,3. A reaction flask was equipped with 2 dropping funnels and a Dry Ice trap to remove and condense the volatile solvent, ethyl chloride, used in the polymerization. One dropping funnel was charged with 128 ml. of the alpha olefin mixture containing 5% 1–3 butadiene. The remaining funnel was charged with 250 ml. of a saturated solution of $AlCl_3$ in ethyl chloride at 5° C. Both the olefin mixture and catalyst solution were introduced into the 2-liter reaction flask at the same time, with the olefin mixture being introduced at a rate of 25 ml./minute, the catalyst solution at 48 ml./minute. The total time for introducing olefin and catalyst solution was 5 minutes 20 seconds, and the polymerization mixture was stirred for an additional 24 minutes. 250 ml. of isopropyl alcohol was added to quench the catalyst, and 250 ml. of hexane was added. The polymer was washed with water and stripped of solvents.

The polymer had a KV at 210° F. of 167.40 centistokes and an iodine number of 29.0.

Various amounts of polymer product were then blended with No. 2 fuel oil and the pour point of the blends determined. The No. 2 fuel is a distillate fuel composed of 50 volume percent water white distillate having an end point of 565° F. and 50 volume percent light cycle oil derived by catalytic cracking of gas oil. For comparison, the pour point of No. 2 fuel oil without an additive was determined. The results are shown below:

| Percent polymer: | Pour point, ° F. |
|---|---|
| 0.20 | −65 |
| 0.10 | −35 |
| 0.05 | −15 |
| 0.00 | 0 |

The data clearly demonstrate the pour point reducing properties of the polymer of the present invention.

*Example II*

The same type of equipment was used as in Example I to polymerize a mixture of a $C_{18}$ alpha-olefin and a butadiene-1,3. One dropping funnel was charged with 178 ml. of the mixture of $C_{18}$ alpha olefin and 1–3 butadiene containing 13% by weight butadiene. The remaining dropping funnel was charged with 270 ml. of a saturated solution of $AlCl_3$ in ethyl chloride at 12° C. Both olefin and catalyst solution were introduced into the reaction flask at the same time, the olefin mixture being introduced at a rate of 35 ml./minute, the catalyst solution at a rate of 55 ml./minute. The total time for introducing olefin and catalyst was 5 minutes, and the polymerization mixture was stirred for an additional 24 minutes. 170 ml. of ethyl chloride was given off and trapped out of the system during the polymerization. The volatile ethyl chloride acted as a coolant to hold the temperature of polymerization constant. 250 ml. of isopropyl alcohol was added to quench the catalyst, and 250 ml. of hexane was added to dilute the polymer. The polymer was washed with the $H_2O$ and stripped of solvent material. The polymer had a KV at 210° F. of 303.73 centistokes and an iodine number of 43.1.

Various amounts of the polymer were blended in the No. 2 fuel oil of Example I and the pour point of the blends determined. The pour point of a fuel containing no polymer was also determined for purpose of comparison.

| Percent polymer: | Pour point, ° F. |
|---|---|
| 0.20 | −35 |
| 0.10 | −10 |
| 0.05 | − 5 |
| 0.00 | 0 |

Comparison of the data of Example II with the data of Example I shows the unexpected pour point reducing properties provided fuels by employing a polymer of a mixture of $C_{16}$–$C_{18}$ alpha olefins and butadiene as compared to a polymer and butadiene of a normal $C_{18}$ alpha olefin alone and butadiene.

It is claimed:

1. A normally liquid, mineral oil-compatible polymer of about 1 to 20% by weight butadiene and 99 to 80% of a mixture of normal alpha olefins containing at least about 25% $C_{16}$ normal, alpha olefin, at least about 20% $C_{18}$ normal, alpha olefin and up to about 50% of normal alpha olefins in the $C_{10}$ to $C_{24}$ range other than $C_{16}$ to $C_{18}$, said polymer having a Staudinger molecular weight of about 1000 to 20,000.

2. The polymer of claim 1 wherein the weight percent of butadiene is about 2 to 15%.

References Cited

UNITED STATES PATENTS

| | | | |
|---|---|---|---|
| 2,551,641 | 5/1951 | Seger et al. | 260—680 X |
| 2,746,925 | 5/1956 | Garber et al. | 252—59 |
| 3,156,736 | 11/1964 | Southern et al. | 260—683.15 |

PAUL M. COUGHLAN, Jr., *Primary Examiner.*